United States Patent [19]
Kraeutner et al.

[11] Patent Number: 6,130,641
[45] Date of Patent: Oct. 10, 2000

[54] IMAGING METHODS AND APPARATUS USING MODEL-BASED ARRAY SIGNAL PROCESSING

[75] Inventors: Paul Kraeutner, Port Moody; John Bird, Port Coquitlam, both of Canada

[73] Assignee: Simon Fraser University, Burnaby

[21] Appl. No.: 09/148,131

[22] Filed: Sep. 4, 1998

[51] Int. Cl.[7] .................................................. G01S 13/89
[52] U.S. Cl. .............................. 342/179; 342/22; 342/25; 342/176; 342/190; 342/191; 342/195; 367/7; 367/87; 367/88; 367/117; 367/131
[58] Field of Search .................................. 367/7–11, 87, 367/88, 117, 131; 342/22, 25, 59, 175–186, 190–197

[56] References Cited

U.S. PATENT DOCUMENTS

| | | | |
|---|---|---|---|
| 4,829,303 | 5/1989 | Zebker et al. | 342/25 |
| 4,862,180 | 8/1989 | Martin . | |
| 4,973,111 | 11/1990 | Haacke et al. . | |
| 5,077,699 | 12/1991 | Passamante et al. . | |
| 5,200,931 | 4/1993 | Kosalos et al. . | |
| 5,307,070 | 4/1994 | Runge et al. | 342/25 |
| 5,440,309 | 8/1995 | Moreira et al. | 342/25 |
| 5,610,610 | 3/1997 | Hudson et al. | 342/25 |
| 5,748,507 | 5/1998 | Abatzoglou et al. . | |

OTHER PUBLICATIONS

English Abstract for Japan Patent Application JP09171069A. Jun. 1997.

*Primary Examiner*—Bernarr E. Gregory
*Attorney, Agent, or Firm*—Oyen Wiggs Green & Mutala

[57] ABSTRACT

An apparatus and method for imaging uses a transducer array which receives a scattered signal from a region of interest. The method analyses the scattered signal on the basis of a model which assumes several independent point scatterers at each range. The method determines the amplitudes and angles of arrival for the several scatterers. The method provides much higher resolution than is possible with conventional beam formed sonar arrays of practical size. The method is capable of resolving features which cannot be resolved by conventional sidescan sonar or interferometric side scan sonar. The method may be used with electromagnetic or acoustic scattering signals.

41 Claims, 9 Drawing Sheets

IMAGING METHODS AND APPARATUS USING MODEL-BASED ARRAY SIGNAL PROCESSING

FIELD OF THE INVENTION

This invention relates generally to the field of constructing 2-dimensional or 3-dimensional images of surfaces and objects in a volume from signals scattered by those surfaces or objects. The invention has particular application in acoustic imaging. The invention may also be applied to radar imaging. The invention may be applied to terrain mapping, object detection, object avoidance, medical ultrasound imaging and the like.

BACKGROUND OF THE INVENTION

Acoustic imaging is used as an adjunct to optical imaging in media where light is either unavailable or severely attenuated. Underwater acoustic imaging is generally used in place of optics at ranges greater than 10 meters, when water conditions are turbid, or when ambient light is insufficient and it is impractical to provide artificial light. Medical ultrasound is used in place of optics for inexpensive non-invasive imaging of and through fluid bathed tissue and organs.

In both underwater acoustic imaging and medical ultrasound, acoustic images are constructed by transmitting acoustic energy into an environment (typically but not necessarily fluid filled) and then measuring and sorting the received echoes according to their spatial origin. This sorting is usually accomplished with either an acoustic lens or a beam former through a process known as spatial filtering. Acoustic imaging is similar in process to optical imaging, however acoustic wavelengths at frequencies practical for ocean or medical imaging are considerably larger than optical wavelengths and therefore acoustic image resolution is comparatively quite poor, even with much larger physical apertures.

Most attempts to improve the spatial resolution of acoustic imaging systems have focussed on increasing the size of the aperture in the system. While it is possible to construct acoustic imaging systems which have large apertures and therefore have improved spatial resolution, such systems are physically large and complicated. They would not be appropriate, for example, for use on a small autonomous underwater vehicle.

Prior art methods for acoustic imaging may be divided into two main categories, beam former or lens based imaging and spatial modelling based imaging. Beamformer or lens based imaging methods presume a full and continuous angular arrival spectrum. The angle of arrival of a reflected signal is measured directly by performing spatial filtering to sort the entire spectrum into bins. The angular extent of each bin (beamwidth) decreases approximately as the inverse of the number of equi-spaced array elements. In the simplest example of beamformer imaging, a single point scatterer is excited monostatically by a short, narrow band acoustic pulse. The resulting backscatter is received by an N element linear array of transducers with half wavelength element spacing $$\left(\text{i.e. } d = \frac{\lambda}{2}\right).$$

Scanning a beam, formed from the array elements, across the scatterer will produce a two dimensional image with range resolution determined by the acoustic pulse length and angular resolution governed by the array aperture size (e.g. by N).

A spatial modelling approach, on the other hand, is able to utilize as few as 2 array elements to produce a similar two dimensional image by estimating the backscatter wave number (i.e. angle-of-arrival (AOA)). The range resolution remains the same as for the beamformed case however, the angular resolution is no longer restricted by the aperture size and instead is limited only by the adherence of the signal to the underlying model assumptions and the display pixel size. The disadvantage of spatial based modelling is that the image will be valid only when the underlying model is satisfied. Artifacts of various kinds may be created if the underlying model is not satisfied.

An example of a successful spatial modelling based imaging method is sidescan sonar. In sidescan sonar a short acoustic is pulse is transmitted from a single transducer array. The array is designed to generate a fan-shaped beam that is quite narrow in the horizontal direction. The beam is oriented in a side-looking geometry. After an acoustic pulse has been transmitted the array detects a backscattered signal from the narrow strip of seafloor illuminated by the transducer beam pattern. The signal reflected from the seafloor is detected by the transducer. In sidescan sonar the angle of arrival of the backscattered signal is not directly measured. Instead, the acoustic angle-of-arrival, $\theta$, is inferred from the time of arrival of the reflected signal. That is, the angle of arrival is assumed to be a function of range, R. The function can be derived from the known sonar altitude, H and the assumption that the seafloor is predominantly flat. Successive strips are imaged by plotting the backscatter intensity in x at constant y and then advancing the sensor platform along the Y axis and repeating the transmit/receive operation. The resulting two dimensional image can be quite spectacular with an angular image resolution that is far superior to that achievable via beamforming. Sidescan sonar is widely used for qualitative seafloor exploration and search applications. A problem with sidescan imaging is that the sea floor is, in general, not flat. This departure from the model can result in the generation of various artifacts in a sidescan sonar image and makes sidescan sonar unsuitable for making quantitative measurements.

A variation of sidescan imaging is swath bathymetry sidescan ("SBS"). In SBS, a vertical linear array of two sets of transducers is used. Differential phase between the two sets of transducers in the array can be used to directly estimate the backscatter angle-of-arrival as a function of time instead of relying on the assumption that the seafloor is flat. Because $\theta$ is measured rather than assumed, SBS can, under favourable backscatter conditions, provide an accurate geometric representation of the imaging surface and can therefore be used for quantitative bathymetric mapping as well as qualitative imaging.

Both SBS and conventional sidescan sonar presume one scatterer per range cell. In practice, multiple scatterers may actually contribute to the backscatter signal measured at a particular instant. The backscattered signals from such multiple scatterers can interfere at the receive transducers. If the amplitude of the backscatter is corrupted by scatterer interference then the image is said to include "scintillation" or "speckle". Similarly, if the differential phase of the backscatter is corrupted by scatterer interference the image is said to include "glint". Both scintillation and glint are well known sources of distortion not only in underwater acoustic imaging and mapping systems but also in terrestrial and space radar imaging and mapping systems.

There is a need for acoustic imaging methods and apparatus which provide better spatial resolution than is currently available. There is also a need for acoustic imaging methods which reduce the incidence of artifacts produced by conventional sidescan systems or SBS systems.

SUMMARY OF THE INVENTION

This invention provides a method for imaging a region. The region may be under water. The method begins by transmitting a pulse toward the region. The pulse may be an acoustic pulse or an electromagnetic pulse. The method continues with the step of detecting a signal scattered from the region to yield a multi-channel scattering signal at a receiver transducer array comprising a plurality of N elements. L snapshots are obtained, where L is an integer with $L \geq 1$, by sampling the scattering signal at one or more instants after transmitting the pulse to yield a plurality of complex samples. In a processing device, which may be a programmed computer, the plurality of complex samples are processed to obtain image data comprising angles of arrival from M principal scattering components, where M is an integer, with $1 \leq M \leq N-1$. The case where $M \geq 2$ provides particular advantages over the current state of the art. Preferably the processing is performed by: constructing a sample matrix $S_{L,M,N}$ from the complex samples; from the sample matrix computing a null-space vector w comprising a plurality of entries; computing a plurality of roots of a polynomial formed from the entries of the null-space vector; and, from the roots of the polynomial computing angles of arrival for M principal scattering components. Finally, the method stores the angles of arrival as image data.

In preferred embodiments the step of computing the null space vector comprises numerically finding a vector w in a search space according to a best fit criterion. The best fit criterion may be selected from the group consisting of: maximum likelihood, sub-space decomposition fitting or least squares.

Preferably, the step of processing the plurality of complex samples comprises: selecting those roots of the polynomial which have a magnitude in the range of $1-\Delta_1$ to $1+\Delta_2$, where $\Delta_1$ and $\Delta_2$ are predetermined threshold values; and storing as image data only the angles of arrival corresponding to the selected roots.

Most preferably processing the complex samples comprises computing amplitudes for the M scatterers from the sample matrix and the angles of arrival and storing the amplitudes with the image data. The amplitudes may be compared to a threshold a binary value indicating whether the amplitudes are greater than or less than the threshold may be stored with the image data. This reduces storage requirements for the image data and simplifies display of the image data.

The step of processing the plurality of complex samples optionally includes the steps of: forming Q beams with offset phase centers by taking linear combinations of the complex samples, where $Q \leq N$, and forming the sample matrix from outputs of the beams.

Another aspect of the invention provides a method of producing image data by processing scatter signal data received at a multi-channel transducer. The scatter signal data comprises a plurality of sets of complex samples detected sequentially at a transducer array. Each set comprises a complex sample obtained from each of a plurality of elements in the array. The method comprises: constructing a sample matrix $S_{L,M,N}$ from the complex samples; computing a null-space vector w having a plurality of entries from the sample matrix such that: $S_{L,M,N} w = 0$; computing the roots of a polynomial formed from the entries of the null-space vector; computing angles of arrival for one or more principal scatterers from the roots of the polynomial; and, storing the angles of arrival as image data.

Yet another aspect of the invention provides an imaging system comprising: a transmit transducer; a pulse generator connected to the transmit transducer; a receive transducer array; a receiver connected to the receive transducer array; a processor connected to receive the series of complex samples from the digital to analog conversion circuit and, a display device driver. The receiver comprises: a multi-channel amplifier for amplifying scattered signals detected by each element of the receive transducer array; and, a digital to analog conversion circuit connected to the multi-channel amplifier to sample the amplified scattered signals to produce a series of complex samples. The processor is adapted to, for each of a plurality of ranges: select a group of complex samples corresponding to a range; construct a sample matrix $S_{L,M,N}$ from the group of complex samples; compute a null space vector w comprising a plurality of entries from the sample matrix; compute the roots of a polynomial formed from the entries of the null-space vector; compute angles of arrival for one or more scatterers from the roots of the polynomial; compute amplitudes for the one or more scatterers from the sample matrix and the angles of arrival; and, store the range, angles of arrival and amplitudes as image data. The display driver is connected to receive the image data and to display the image data on a display device. The transmit transducer may comprise one or more of the same transducer elements which make up the receive transducer array.

Yet another aspect of the invention provides a processing unit for processing scattering signal data received at a multi-channel transducer to yield image data, the scattering signal data comprising a plurality of sets of complex samples, the sets detected sequentially at a transducer array, each set comprising a complex sample obtained from each of a plurality of elements in the array. The processing unit comprises: means for selecting a group of complex samples corresponding to a distance range; means for constructing a sample matrix $S_{L,M,N}$ from the group of complex samples; means for computing a null-space vector w comprising a plurality of entries from the sample matrix; means for computing the roots of a polynomial formed from the entries of the null-space vector; means for computing angles of arrival for two or more scatterers from the roots of the polynomial; means for computing amplitudes for the two or more scatterers from the sample matrix and the angles of arrival; and, means for storing the range, angles of arrival and amplitudes as image data.

The invention also provides a computer readable medium containing computer software. The computer software, when run on a computer, causes the computer to operate so as to provide a processing means for: constructing a sample matrix $S_{L,M,N}$ from a set of complex samples; obtaining from the sample matrix a null-space vector w; computing the roots of a polynomial formed from the entries of the null-space vector; computing angles of arrival for one or more scatterers from the roots of the polynomial; computing amplitudes for the one or more scatterers from the sample matrix and the angles of arrival; and, storing the angles of arrival and amplitudes as image data.

Other aspects and advantages of the invention will become apparent to those skilled in the art who read and understand the following disclosure.

BRIEF DESCRIPTION OF THE DRAWINGS

In drawings which illustrate and explain specific embodiments of the invention, but which should not be construed so as to limit the scope of the invention.

DETAILED DESCRIPTION

Figure 1:
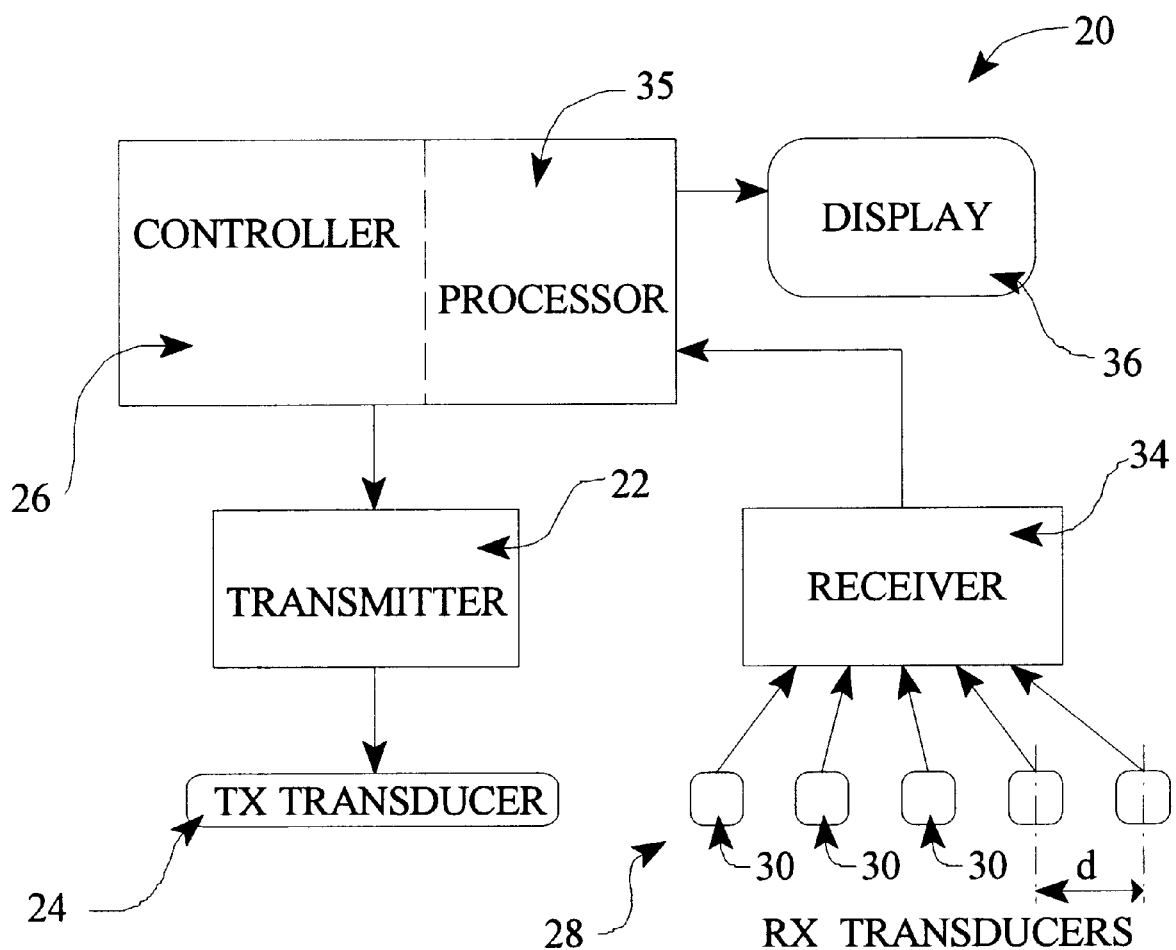
FIG. 1 is a functional block diagram of an acoustic imaging system according to the invention.
Figure 3A:
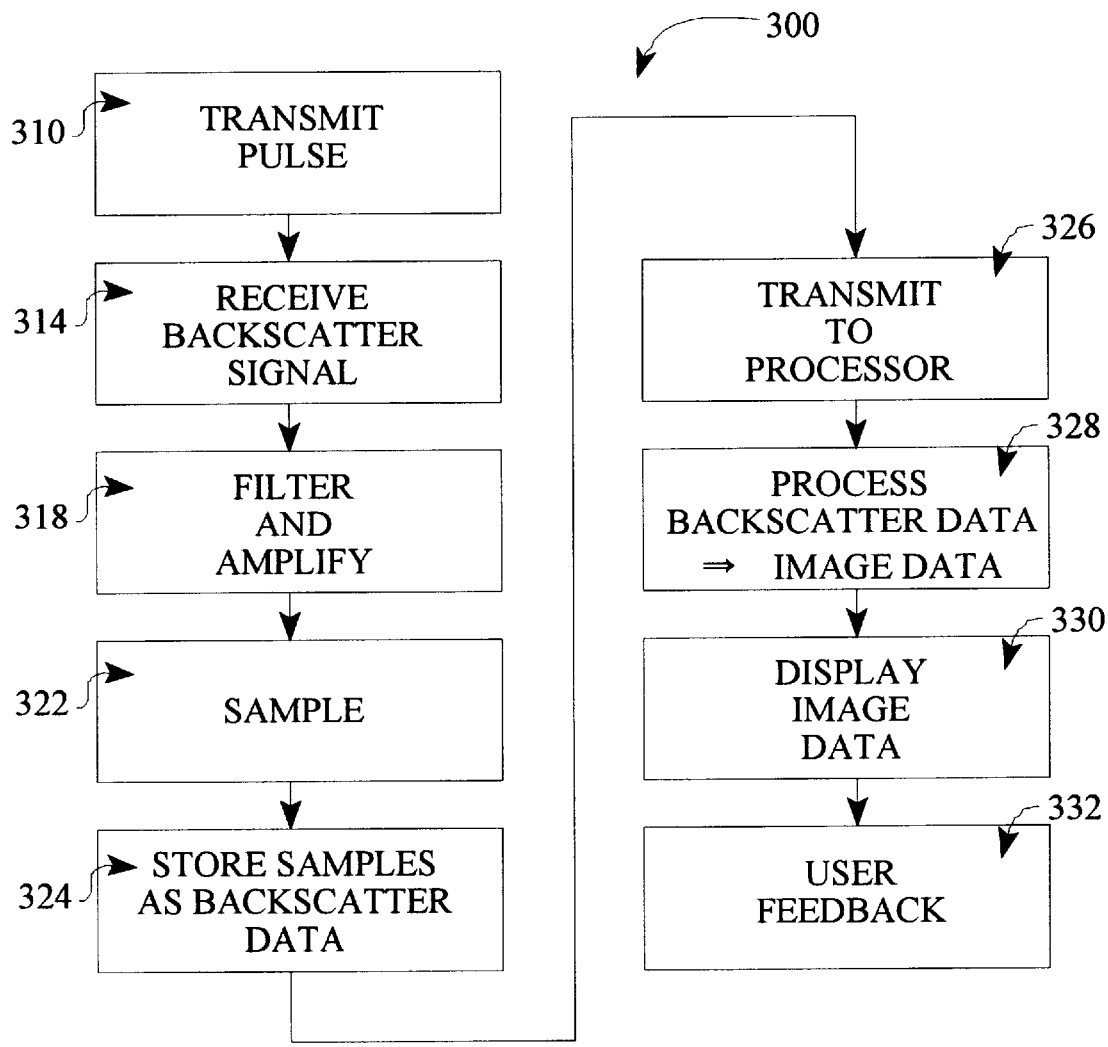
FIGS. 3A, 3B and 3C are flow diagrams illustrating one example of an imaging method according to the invention.

FIG. 1 is a functional block diagram of an acoustic imaging system 20 according to the invention. FIG. 3A illustrates a method 300 implemented when system 20 is operated. Imaging system 20 comprises a transmitter 22 connected to a transmit transducer 24. Transmitter 22 and transmit transducer 24 are operated under the control of a controller 26 to insonify the environment which is to be imaged. Transmitter 22 is pulsed on and off. Transmitter 22 is preferably operated to produce short pulses of sound directed toward a region to be imaged (step 310). The range of objects being imaged at any instant can be determined from the time since the pulse was transmitted. The range resolution is determined by the transmit pulse bandwidth. Transmit transducer 24 preferably provides a fan-shaped beam pattern so that the transmitted signal $s_{tx}(t)$ can be considered to propagate in a two-dimensional plane (i.e. a slice of a three-dimensional volume).

The transmitted signal $s_{tx}(t)$ may take many forms, for example, the transmitted signal pulse may be a simple gated sinusoid, a swept FM chirp, an M-sequence PSK waveform. The sinusoidal signal represents the fundamental waveform. Other waveforms can be analysed as superpositions of sinusoidal waveforms. Consequently, a sinusoidal waveform will be used to explain the operation of this invention. In preferred systems non-sinusoidal waveforms may be used to afford post processing signal-to-noise ratio improvement by increasing the time-bandwidth product as is known to those skilled in the art.

The transmitted signal propagates into the environment and is scattered by surfaces or objects in the environment. As a result, a scattered signal propagates toward a receive transducer 28. Receive transducer 28 is typically located near transmit transducer 24. In general, receive transducer 28 may be remote from transmit transducer 24. Receive transducer 28 comprises a linear array of N transducer elements 30 spaced apart from one another by a distance d. In practice the same transducer may serve both as a transmit transducer 24 and as receive transducer 28. A receiver 34 is connected to receive the scattered signals $s_1(t), s_2(t), s_3(t) \ldots s_N(t)$ (FIG. 2) received respectively at the N elements 30 of receive transducer 28 (step 314). Receiver 34 filters and amplifies the received signals (step 318) and periodically samples the inphase and quadrature components at the outputs of each of elements 30 (step 322).

Receiver 34 should be capable of sampling the inphase and quadrature components of the outputs of elements 30 at a rate which is at least equal to the receiver bandwidth about the carrier frequency of the transmitted signal $s_{tx}(t)$ in order to avoid aliasing. The sampled signals are optionally stored (step 324) and conveyed as complex samples (each complex sample typically consists of inphase and quadrature samples) to a processor 35 in controller 26 (step 326).

Processor 35 may begin processing as soon as the first set of samples has been received or may process a complete set of sampled signals after all of the samples have been taken and stored. Processor 35 processes the sampled signals to yield image data (step 328) and assembles an image which is displayed on a display 36 (step 330). Processor 35 may process the sampled signals in real time or may process stored sampled values. Processor 35 may simply store the image data for later display or manipulation. The image data may be displayed or used as input for another processing stage, such as a stage for generating a contour map.

System 20 optionally accepts input from a user as to new values for various parameters used during processing and/or data collection/display steps 310–330 (step 332) the image data may then be re-calculated or re-collected and re-calculated for display using the new parameter values. This permits the displayed image to be fine tuned by a user.

Before further describing apparatus which may be used in the practice of the invention, the processing methods of the invention will be described in detail. The systems and methods of this invention are based upon a model which assumes up to M scatterers at each range. The model assumes that the scatterers are sufficiently far away as compared to the wavelength of the scattered signals so that the signal scattered by each scatterer can be treated as a plane wave upon arrival at receive transducer array 30 (the far field assumption). This invention provides imaging systems and methods in which an image is constructed by explicitly computing as many as M=N−1 plane wave arrival angles, or arrival angles and amplitudes, as a function of range from an N element linear array. Resolution is increased as compared to prior art beamformed imaging systems because the model predetermines the nature of the imaging geometry and then uses the received signal to fine tune the model.

Figure 2:
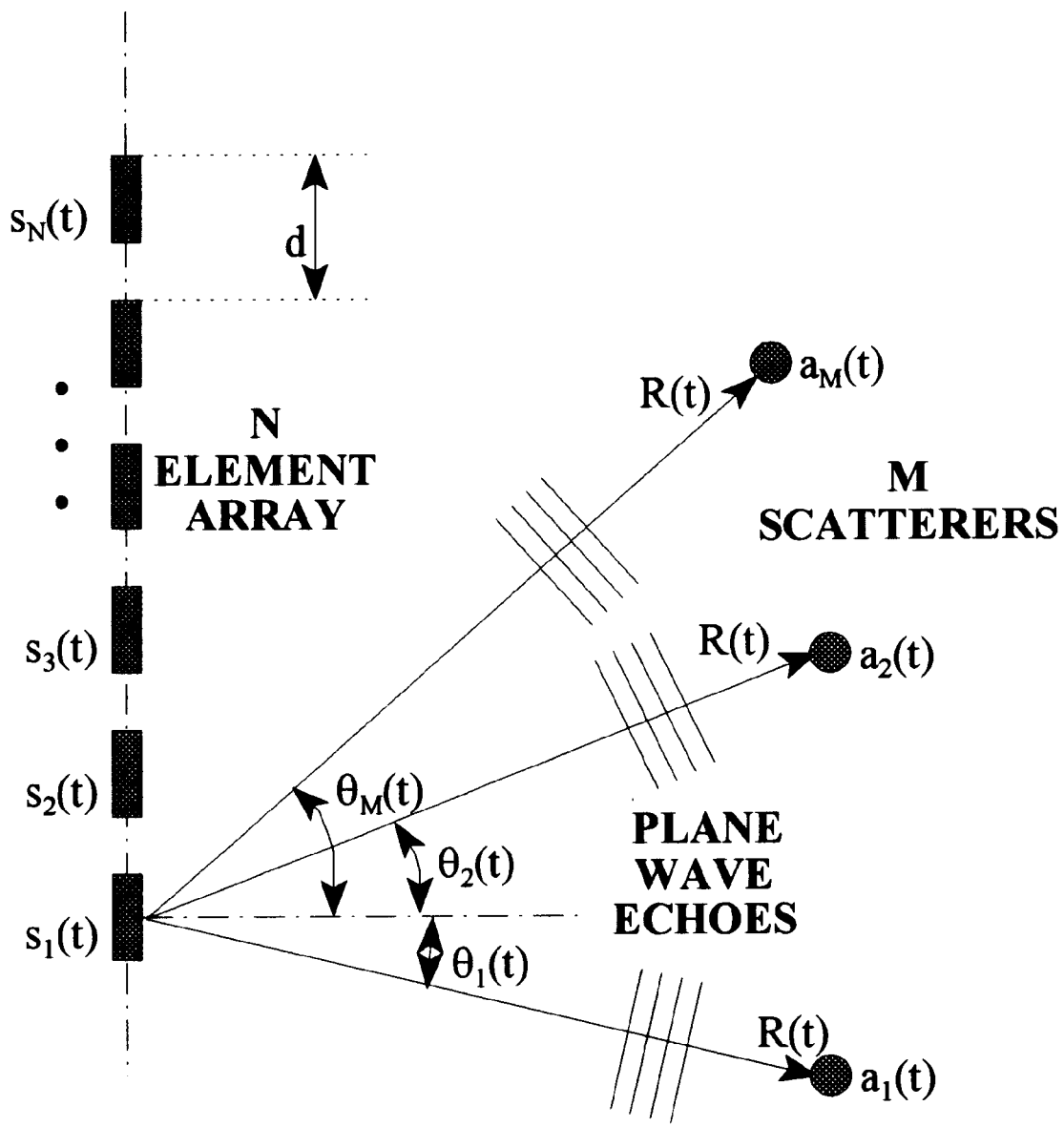
FIG. 2 is a schematic drawing showing a number of scatterers in the far field of a receiver array.

FIG. 2 illustrates schematically a situation where M independent scatterers at a range R(t) each scatter a signal having a complex amplitude $\alpha_m(t)$ toward N element receiver transducer array 28. We assume the far field condition and that the scattered signal from the Mth scatterer has a constant complex amplitude $\alpha_m$; with $1 \leq m \leq M$ across all of the elements 30 of receiver array 28 (the steady state condition). The signal $s_n$ at the $n^{th}$ element 30 at a particular instant in time can thus be written as:

$$s_n = \sum_{m=1}^{M} a_m e^{-j(n-1)du_m} \qquad (3)$$

where $u_m = k \sin\theta_m$ is the acoustic wave number; $\theta_m$ is the angle-of-arrival of the scattered signal from the $m^{th}$ scatterer; $k=2\pi/\lambda$; $\lambda$ is the acoustic wavelength at the carrier frequency, and j is the square root of −1.

The assumed model has 2M unknown parameters, M values for $\alpha_m$ and M values for $u_m$. Generating an image according to a general embodiment of the invention involves using measured values of $s_n$ to solve for these 2M unknown parameters.

Several methodologies exist for deriving the 2M parameters from the array measurements. These methods include an exact solution method, applicable in the idealized case, as well as numerous "best fit" solution methods more suitable when the signal model is better viewed as an approximation to real scattering signals. In order to illustrate the mathematical principles behind the invention, the idealized case is considered first and the exact solution strategy is described. The exact solution strategy is then extended to demonstrate one example of a best fit solution strategy for application to real scattered signals. Those skilled in the art will appreciate that there may be numerous variations of the particular methods described herein which may all be used without departing from the scope of this invention. Some of these variations are discussed below.

Under the idealized scattering conditions illustrated in FIG. 2, the scattered signals received by the array elements 30 are exactly described by equation (2). One can solve first for the parameters $u_m$ by finding an array of N steering coefficients $w_n$ such that the null-steering equation:

$$0 = \sum_{n=1}^{N} w_n s_n \quad (4)$$

is satisfied. This equation can be rewritten by substituting the value of $s_n$ from equation (2) to yield:

$$0 = \sum_{m=1}^{M} a_m \sum_{p=0}^{N-1} w_p z^{-p}; \quad p = n-1 \quad (5)$$

$$= \sum_{m=1}^{M} a_m W(z)$$

$$z = e^{j d u_m}$$

where $W(z)$ is the z-transform of the array steering coefficients $w_p$ and is a polynomial of order N−1.

The sum in equation (4) will equate to zero independently of the amplitudes $\alpha_m$ if $W(z)$ is zero at each of the z-plane evaluation points $z = e^{j d u_m}$. One evaluation point is associated with the direction of each of the M scatterers. $W(z)$ has N−1 roots and can therefore satisfy equation (4) provided that the number of array elements 30 is at least M+1. To avoid the trivial solution one can set $w_0 = 1$.

Solving equation (4) for the 2M parameters is accomplished in two steps. First, M linearly independent instances of equation (4) are used to solve for the wavenumbers of M scattered signals. Next, the same set of independent equations and the newly obtained wavenumbers are used to compute the complex amplitudes of the scattered signals. The required M linearly independent equations may be obtained by finding situations where $\alpha_m$ vary independently for constant wavenumbers $u_m$.

There are two main ways to obtain the M independent equations. The first way is used when the signals received from the M scatterers are coherent or only a single "snapshot" is available. A snapshot is a set of complex samples taken at the same instant from each of the elements 30 of receive array 28. Using a single snapshot provides maximum range resolution. The second way can be used when the signals from the M scatterers can be assumed to be uncorrelated but cannot be used when the signals are correlated. In practical terms, the methods of the invention differ between these two cases in the number of scatterers M that can be resolved with a given receive array 28 and the number of snapshots that must be used to resolve the amplitudes and angles of arrival from the M scatterers. The coherent case will be addressed first. The general methods of the invention are illustrated by the coherent case. The methods of the invention are extended to the uncorrelated case below. Finally a generalized procedure which can accommodate both is coherent and incoherent scattering assumptions is presented.

For M scatterers, which may be coherent or incoherent, the M necessary equations may be obtained by subdividing the N elements 30 into M overlapping sub-arrays each having M+1 elements. The M sub-arrays yield M independent equations in the form of equation (4). These equations can then be solved to yield the M values of $w_p$ needed to satisfy equation (4). For example, the null-steering equations for two sub arrays are given as follows:

$$\text{sub-array\#1} \quad 0 = \sum_{m=1}^{M} a_m \sum_{p=1}^{M+1} w_p e^{-j(p-1)d u_m} \quad (6)$$

$$\text{sub-array\#2} \quad 0 = \sum_{m=1}^{M} a_m \sum_{p=2}^{M+2} w_p e^{-j(p-1)d u_m}$$

$$= \sum_{m=1}^{M} a_m e^{-j d u_m} \sum_{p=1}^{M+1} w_p e^{-j(p-1)d u_m}$$

$$= \sum_{m=1}^{M} \hat{a}_m e^{-j d u_m} \sum_{p=1}^{M+1} w_p e^{-j(p-1)d u_m}$$

where $\alpha_m$ and $\hat{\alpha}_m$ are independent.

Figure 3B:
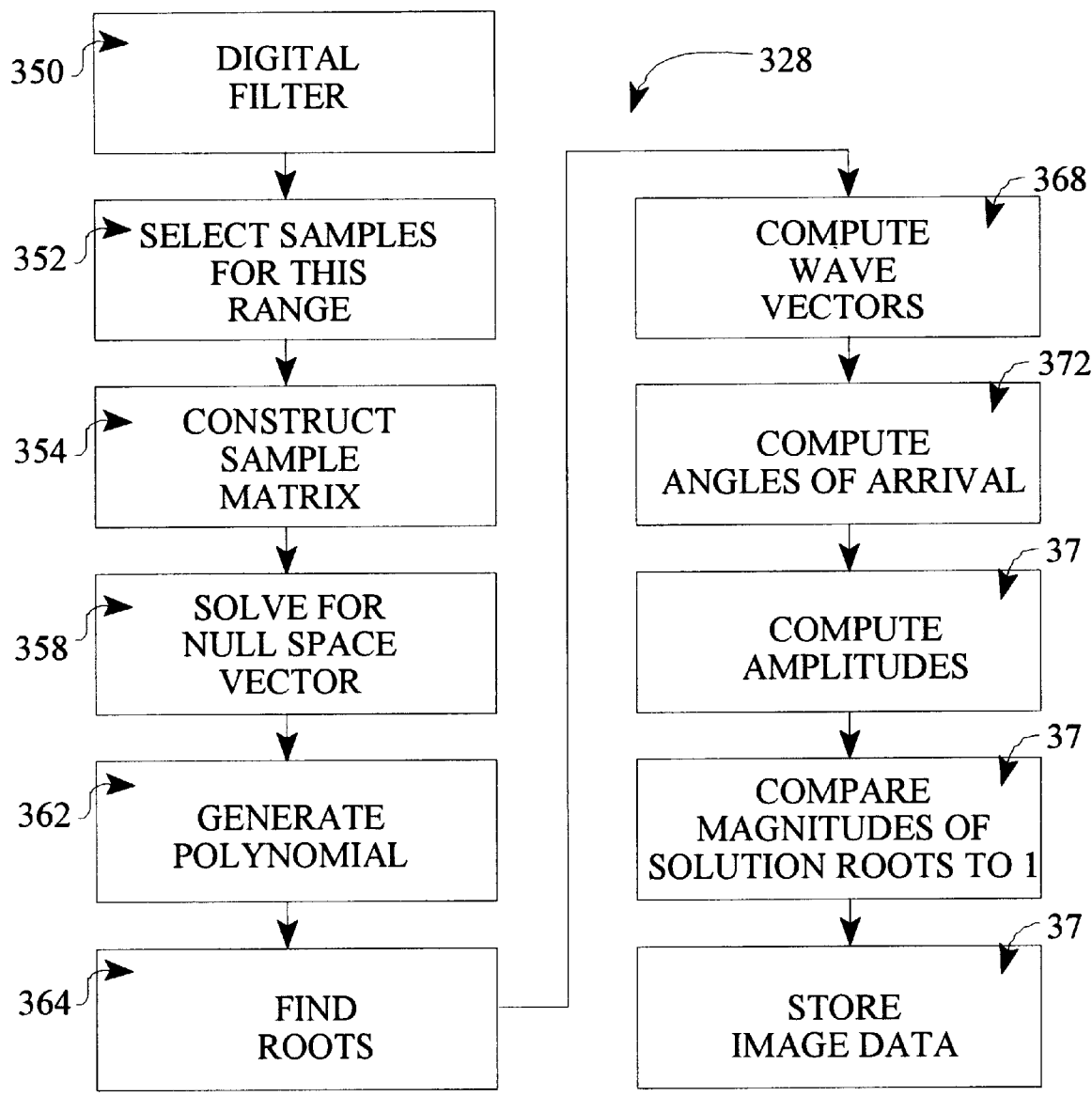

Thus, the process for computing the directions of M coherent point scatterers from complex samples taken at 2M elements of a transducer array can be summarized as shown in FIG. 3B and described using vector notation as follows. A group of complex samples to be used for a given range is identified (step 352). This group may consist of a single snapshot containing a complex sample taken at each element 30 of receive array 28. Then a sample matrix S is prepared using the group of complex samples as its elements (step 354). The sample matrix S contains measured complex values representing the inphase and quadrature components of scattered signals received at the elements 30 of receive array 28. The sample matrix may have various forms but can be conveniently represented as follows:

$$S_{1,M,2M} = \begin{pmatrix} s_1(l) & s_2(l) & s_3(l) & \ldots & s_{M+1}(l) \\ s_2(l) & s_3(l) & s_4(l) & & s_{M+2}(l) \\ \vdots & & & \ddots & \vdots \\ s_M(l) & s_{M+1}(l) & s_{M+2}(l) & & s_{2M}(l) \end{pmatrix} \quad (7)$$

Where $S = S_{L,M,N}$ is the sample matrix formed from L snapshots to solve for M scatterers using signals received at a receive array 28 having N elements 30. For the coherent case the array 28 is taken as consisting of M overlapping sub-arrays (requiring 2M elements). As few as L=1 snapshots may be employed.

The null steering equation can then be represented as follows:

$$Sw = 0 \quad (8)$$

This equation can be solved using standard numerical computing techniques to yield the unknown null steering vector (or "null space vector") w (step 358). A polynomial $W(z)$ is then formed (step 362) as follows:

$$W(z) = z^M + w_1 z^{M-1} + w_2 z^{M-2} + \ldots + w_M \quad (9)$$

The M roots $[z_1, z_2, \ldots, z_M]$ of equation (8) are then calculated (step 364) by standard techniques. The wave numbers corresponding to each of the M scatterers are then calculated (step 368) from:

$$u_m = \frac{-1}{d}\arg(z_m) \quad (10)$$

The angles of arrival from each of the M scatterers can then be calculated (step 372) from:

$$\theta_m = \arcsin\left(\frac{u_m}{k}\right) \quad (11)$$

Once the angles of arrival from the scatterers have been calculated the scattering amplitudes $\alpha_m$ can be calculated (step 374) from the matrix equation:

$$a = B^{-1}s \quad (12)$$

where B is the matrix:

$$B = \begin{pmatrix} 1 & 1 & \ldots & 1 \\ e^{-ju_1} & e^{-ju_2} & & e^{-ju_M} \\ \vdots & & \ddots & \vdots \\ e^{-j(M-1)u_1} & e^{-j(M-1)u_2} & \ldots & e^{-j(M-1)u_M} \end{pmatrix} \quad (13)$$

and s is a column vector formed from one snapshot across M consecutive elements of array 30 (e.g. $[s_1(l)\ s_2(l) \ldots s_M(l)]^T$).

The inverse of B can be calculated by standard numerical means. In the alternative, if only the magnitudes of the scattering amplitudes are required, as is common in imaging applications, then the scattering amplitude magnitudes may be computed by the following equation (13):

$$|\alpha| = \text{diag}(\alpha\alpha^H) \quad (13)$$

where:

$$aa^H = \frac{1}{(N-M)L}(B^H B)^{-1} B^H R_{L,M,N} B(B^H B)^{-1} \quad (14)$$

and:

$$R_{L,M,N} = S_{L,M,N}{}^H S_{L,M,N} \quad (15)$$

and $S_{L,M,N}{}^H$ is the Hermitian transpose of $S_{L,M,N}$.

The difference between the two methods for computing the magnitude of the scatterer amplitudes is that the second method (equations (13)–(15)) allows all L snapshots to be incorporated into each magnitude solution and is therefore effective when a best fit magnitude solution is desired.

Each set of values for $\alpha_m$ and $u_m$ corresponds to a specific range. The range is known from the time at which the scattered signal is sampled. An image can then be prepared from the known values for the range and angles of arrival. Preferably the scattering amplitudes are also used in the preparation of the image. The range and angle of arrival identify a specific pixel in the image. The scattering amplitude may be represented as the intensity or colour of the pixel.

In some cases it may be preferable to compare the scattering amplitude to a threshold value. In one embodiment the scatterer is not displayed unless its amplitude exceeds the threshold value. If the scatterer is displayed then it may be displayed either in a way which depends on the scattering amplitude or all displayed pixels may be displayed in the same way. In the second case the image data requires less storage space.

The foregoing method of image generation requires only a single "snapshot" to produce the image pixels at each range. That is, the image pixels at each range can be generated by sampling the outputs from elements 30 of receive array 28 once at each range (i.e. once in each time slice following the transmission of a pulse). The image pixels may be displayed in various ways to yield 2-dimensional or 3-dimensional images. This method requires a receive transducer array having 2M elements 30.

It can be shown that angles of arrival for M independent scatterers can be measured with fewer than 2M elements in array 28 if the angles-of arrival of the scattered signals change slowly as a function of time. The angles of arrival will change slowly as a function of range in many real situations. Consider, for example, the situation shown in FIG. 4 where contributing scatterers change as the transmitted acoustic pulse $s_{tx}(t)$ propagates along the seafloor and down a vertical feature. At each instant the signal which is scattered back toward receiver array 28 is scattered by a different group of scatterers. It is therefore possible to obtain multiple independent snapshots for the same principal scattering components (e.g. the same portion of the sea floor and vertical feature). Thus, M independent equations may be obtained by assuming that $u_m$ changes only slowly from snapshot to snapshot and that $\alpha_m$ is uncorrelated from snapshot to snapshot. This assumption is often a good assumption because, at each instant, $\alpha_m$ is the result of scattering by a different group of scatterers.

Where $\alpha_m$ is uncorrelated from snapshot to snapshot we can obtain M independent equations from only N=M+1 elements. In this case the sample matrix becomes:

$$S_{M,M,M+1} = \begin{pmatrix} s_1(l) & s_2(l) & s_3(l) & \ldots & s_N(l) \\ s_1(l+1) & s_2(l+1) & s_3(l+1) & & s_N(l+1) \\ \vdots & & & \ddots & \vdots \\ s_1(l+N-2) & s_2(l+N-2) & s_3(l+N-2) & & s_N(l+N-2) \end{pmatrix} \quad (17)$$

Where $S_{M,M,M+1}$ is the sample matrix formed from M snapshots to solve for M scatterers using M+1 elements 30 in receive array 28. Equation (7) can then be solved as set out above to yield angles of arrival and amplitudes using the sample matrix of equation (14). M snapshots (sets of samples) from a single array are used to produce image pixels at each range instead of 1 snapshot taken as M sub-arrays, as set out above. It can be appreciated that range resolution is degraded by using multiple snapshots.

It is possible to generate a sample matrix which includes both information from a number of sub-arrays and information from a number of sequentially taken snap shots. This essentially combines the sample matrices of equations (6) and (16) to yield a sample matrix which provides (N-M)L equations. This sample matrix may be represented as follows:

$$S_{L,M,N} = \begin{pmatrix} s_1(l) & s_2(l) & s_3(l) & \ldots & s_{M+1}(l) \\ s_2(l) & s_3(l) & s_4(l) & & s_{M+2}(l) \\ \vdots & & & & \vdots \\ s_{N-M}(l) & s_{N-M+1}(l) & \ldots & & s_N(l) \\ s_1(l+1) & s_2(l+1) & s_3(l+1) & & s_{M+1}(l+1) \\ \vdots & & & \ddots & \vdots \\ s_{N-M}(l+L-1) & s_{N-M+1}(l+L-1) & s_{N-M+2}(l+L-1) & \ldots & s_N(l+L-1) \end{pmatrix} \quad (18)$$

Here, $S_{L,M,N}$ is the sample matrix for L snapshots taken from a receive array 28 having N elements which may be used to solve for M scatterers. Using a null steering equation based upon the sample matrix of equation (17) it is possible to use the information taken from an N element receive array to solve for the angles of arrival and amplitudes of up to M=N−1 scatterers.

In any real system, noise received at receive array 28 and instrument limitations will corrupt the signals being measured. These errors, which affect each measurement in an unknown way, make it impossible to calculate an exact solution for w, as described above. Instead, it is necessary to attempt to find the best possible solutions which fit the samples taken to within the uncertainty introduced by the error.

There are several strategies that may be used for finding a "best" solution. These strategies include "Least Squares" methods that minimize, in a least squares sense, the output of the null steering equations derived in the exact solution method described above. Alternatively, the sample matrix, or a modification thereof, may be used to derive an estimate of the "spatial covariance matrix". The least squares solution obtained from the array sample matrix can also be obtained from the estimated spatial covariance matrix when the estimated spatial covariance matrix is computed from equation (15). Other solution methods such as "Maximum Likelihood" methods and "Sub-space Decomposition" methods typically utilize the spatial covariance matrix formulation. These methods are related to the Least Squares method but utilize different criteria for choosing the angles of arrival that best fit the measured array data. All of these methods are known to those skilled in the art.

For the purpose of illustration, a Least Squares solution methodology is described here. Those skilled in the art will appreciate that other recognized methods for finding the angles of arrival and associated scattering amplitudes which best fit the measured data may be used without departing from the invention.

Solving for angles of arrival by the least squares method involves obtaining a least squares estimate of the null steering vector w. This may be done using the least squares formulation of equation (7) as follows:

$$w = \min(w)|S_{L,M,N} w|^2 \quad (19)$$

where min(w) indicates minimizing over w. Although a solution to equation (16) is possible for a matrix $S_{L,N,M}$ having any number of rows, in order for a solution to be credible the number of linearly independent rows (the rank of $S_{L,N,M}$) should be at least equal to M. Thus, where single snapshots are taken, the minimum number of elements 30 in array 28 is 2M. On the other hand, where M=N−1, the minimum number of uncorrelated array snapshots is L=N−1 and the array cannot be divided into sub arrays.

Figure 3C:
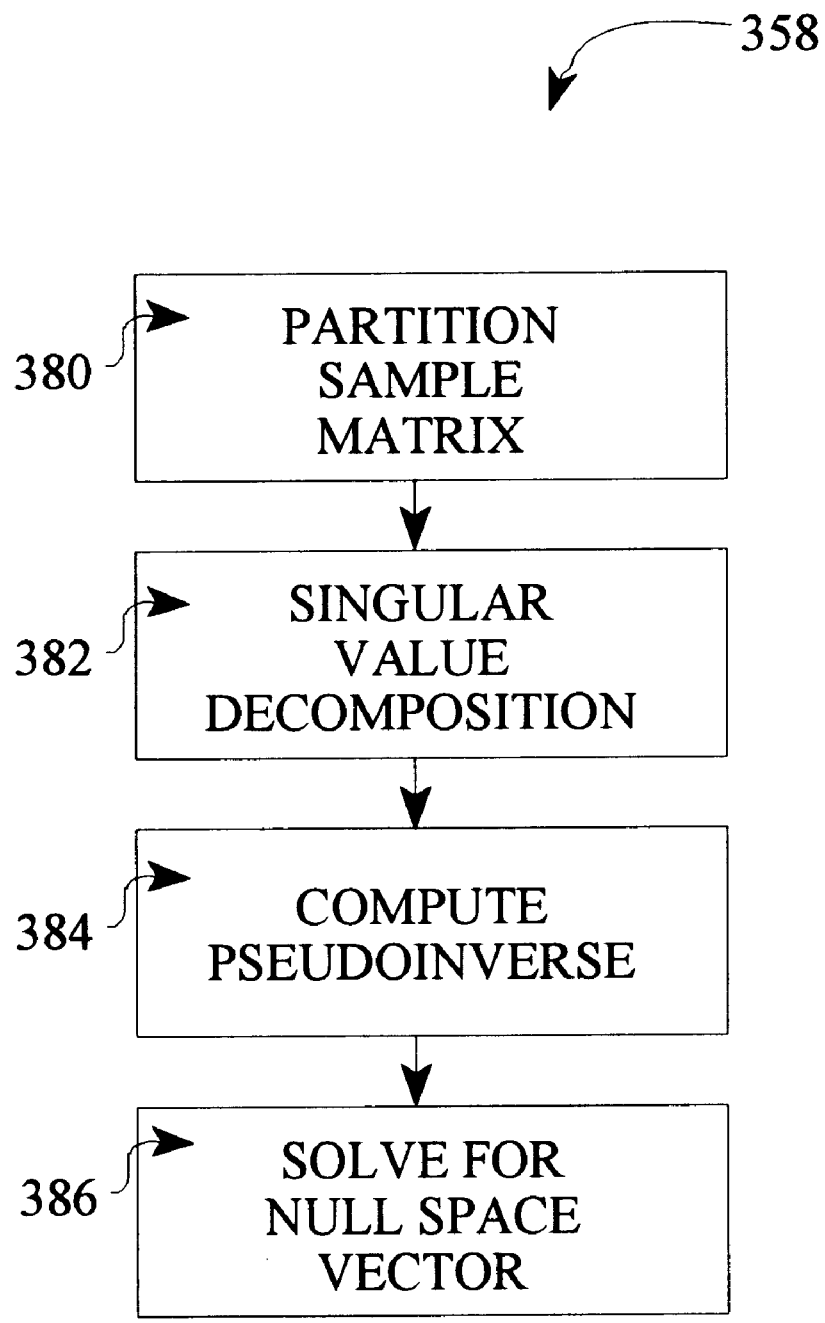

Equation (16) can be solved numerically using techniques well known to those skilled in the art. For example, as shown in FIG. 3C, the sample matrix is first partitioned (step 380). The partition arises from equation (7) and the fact that the first entry in w is 1 (i.e. $w_0$=1 in order to avoid the trivial solution w=0). The partition allows the unknown values of w to be grouped on one side of the equation and the remaining constant term on the other side as:

$$\overline{S}\overline{w} = \overline{s} \quad (19)$$

where:

$$\overline{S} = \begin{bmatrix} S_{1,2} & S_{1,3} & \ldots \\ S_{2,2} & S_{2,3} & \ldots \\ \vdots & \vdots & \ldots \end{bmatrix} \quad (20)$$

and:

$$\overline{s} = [-S_{1,1} - S_{2,1} - S_{3,1} \ldots]^T \quad (21)$$

and:

$$\overline{w} = [w_1 w_2 w_3 \ldots] \quad (22)$$

Singular value decomposition of $\overline{S}$ (step 382) can then be used to compute its pseudoinverse (step 384) in order to solve for the unknown null space coefficients $\overline{w}$ (step 386).

In the foregoing discussion the value of M has been chosen based upon the number of array elements and whether or not the scattered signals can be assumed to be uncorrelated. Since any modelling approach tries to fit the data to a model as best it can, over modelling (using a value of M which is too large) or under modelling (using a value of M which is too small) will degrade the results and may introduce modelling artifacts.

In general applications of the invention, a value for M is chosen such that N/2≦M≦N−1. The value for M may be chosen during the design of a system according to the invention or a system may be designed which allows a user to select an appropriate value for M when the system is being used. The particular value chosen for M will depend upon whether it is expected that the scattered signals might be coherent or it is desired to use single snapshots to obtain better range resolution, on the one hand, or whether the signals scattered by different scatterers can be assumed to be uncorrelated, in which case more scattering components may be resolved with a given receive array 28. In either case, the value chosen for M need be no greater than the expected maximum number of principal scattering components to be estimated. For example, one direct path and one multipath would constitute two principal scattering components. M need not be known a priori. The value selected for M may exceed the number of principal scattering components.

According to the model, all of the solutions that we are interested in correspond to plane waves. One can check each solution to see whether or not it corresponds to a plane wave. Whether or not a solution is a plane wave solution may be determined by testing the solution roots (i.e. the roots z of the polynomial of equation (8)) to determine whether or not they have a magnitude within a predetermined threshold, of 1. That is to ascertain (step 376) whether or not:

$$1-\Delta_1 \leq |z| \leq 1+\Delta_2 \qquad (26)$$

Typically $\Delta_1 = \Delta_2$. It will be appreciated that roots corresponding to plane wave solutions will all lie on the unit circle. That is, roots corresponding to plane wave solutions will all have a magnitude of 1.

For each time step, the M solutions to the null-steering equation are screened using equation (19). Only those solutions which correspond to plane wave solutions are retained. All other solutions may be discarded because they do not fit the assumed model. The retained solutions yield a set of angles of arrival and amplitudes which may be plotted on a display or saved as "display information" for later display.

In some cases it may be preferable to optimize M by beginning with a relatively large value for M, counting the plane wave solutions to equation (18), and using the result as a new value for M and repeating the calculation of equation (18) with the new value for M. This procedure may be iterated until a steady state value for M is obtained. In general the simple approach set out above of selecting a value for M and then discarding non-plane wave solutions to equation (18) has been found to work quite well.

The discussion above explains the basic method of this invention. In general, additional steps should be taken to practise the method in the best way. When the methods of the invention are implemented with a pulsed transmit signal $s_{tx}(t)$ the assumption that the elements 30 of receive array 28 all experience the same acoustic field at all times (i.e. the steady state assumption) does not hold. A pulsed waveform, by definition has a leading edge and a trailing edge.

The leading edge of a received pulse may reach some elements 30 of receive array 28 before it reaches other elements 30. In theory, it is possible for some elements of receive array 28 to have outputs of zero while other outputs have a magnitude equal to the steady state amplitude of the received pulse. This can cause significant errors in the angle of arrival estimates calculated by the methods above. Such errors could cause undesired artifacts in the image produced by the system.

One way to reduce the proportion of time during which the steady state assumption does not hold is to keep the overall length of receive array 28 small. The problem posed by the rising and falling edges of received pulses can also be ameliorated by filtering the signals received by receive array elements 30 with a filter having carefully chosen characteristics. In general it is not desirable to apply sharp band limiting digital filters to the received signals. Applying sharp band limiting filters will cause ringing. The introduction of such ringing, which is known as the Gibbs phenomenon, introduces ripples into the response of the system to pulses. This, in turn, can lead to errors in the angle of arrival estimates. In order to avoid the Gibbs phenomenon, the outputs of elements 30 should be filtered with filters which provide a smooth frequency response. For example, a Gaussian filter characteristic as described in R. E. Ziemer and W. H. Tranter *Principles of Communications* Houghton Mifflin Company, Boston Mass., 1976 may be used to smooth the leading and trailing edges of received pulses without introducing significant variations in steady state regions of the system response pulse.

Those skilled in the art will appreciate that filters having other smooth filter characteristics may be selected for use in smoothing the leading and trailing edges of received pulses in place of a filter having a Gaussian filter characteristic. A suitable filter may be implemented by digitally filtering the sampled signals received at receive array 28 (step 350).

In practice all of the elements of receive array 30 will not be identical. Consequently the receiver gain $G_n$ will vary from element to element. In general $G_n$ is a complex quantity. That is, the channels may be mismatched in both phase and amplitude. Where channel gains are mismatched but can be individually measured correction factors may be applied to the sampled values after they have been collected. In some systems the channel gain is time varying.

It may be desirable to use a time varying gain to compensate for the fact that the received signals tend to drop off in amplitude as a function of range. Where this is done it may also be necessary to apply a time varying correction factor to the sampled values in each channel.

It can be shown that the model assumed by the methods of this invention can reasonably accurately resolve small contiguous scattering regions provided that the scattering distribution within these regions does not produce interference nulls near the direction of the receiver transducer array.

There are at least two ways to use the methods of the invention. A first way is to use the methods of the invention to enhance one or more portions of an image produced by conventional beam formed imaging techniques. For example, the methods could be used to increase the resolution of images of objects in an image obtained by beam formed acoustic imaging in two dimensions with an N element linear array (e.g. an electronically scanned sector scan sonar). For example, a beamformed medical ultrasound image may reveal an area of interest (e.g. a breast calcification) for which resolution enhancement is desired and where the feature appears to satisfy the model assumptions. The selected portion of the image may then be enhanced by reprocessing the array data using the presumed spatial model. The enhanced result can then be confirmed by independently repeating the process a number of times possibly from different viewing angles. The same procedure can also be used in underwater acoustic imaging.

Spatial filtering and spatial modelling can be combined to provide image enhancement. This is preferable where the image includes dissimilar objects. In this case a number of parallel beams are formed by grouping receive transducer elements into sub-arrays. The beams will have equi-spaced phase centres. When an object of interest has been located, spatial modelling may be applied using the outputs of the parallel beams rather than the individual array element outputs for the samples of the scattered signal.

Figure 5:
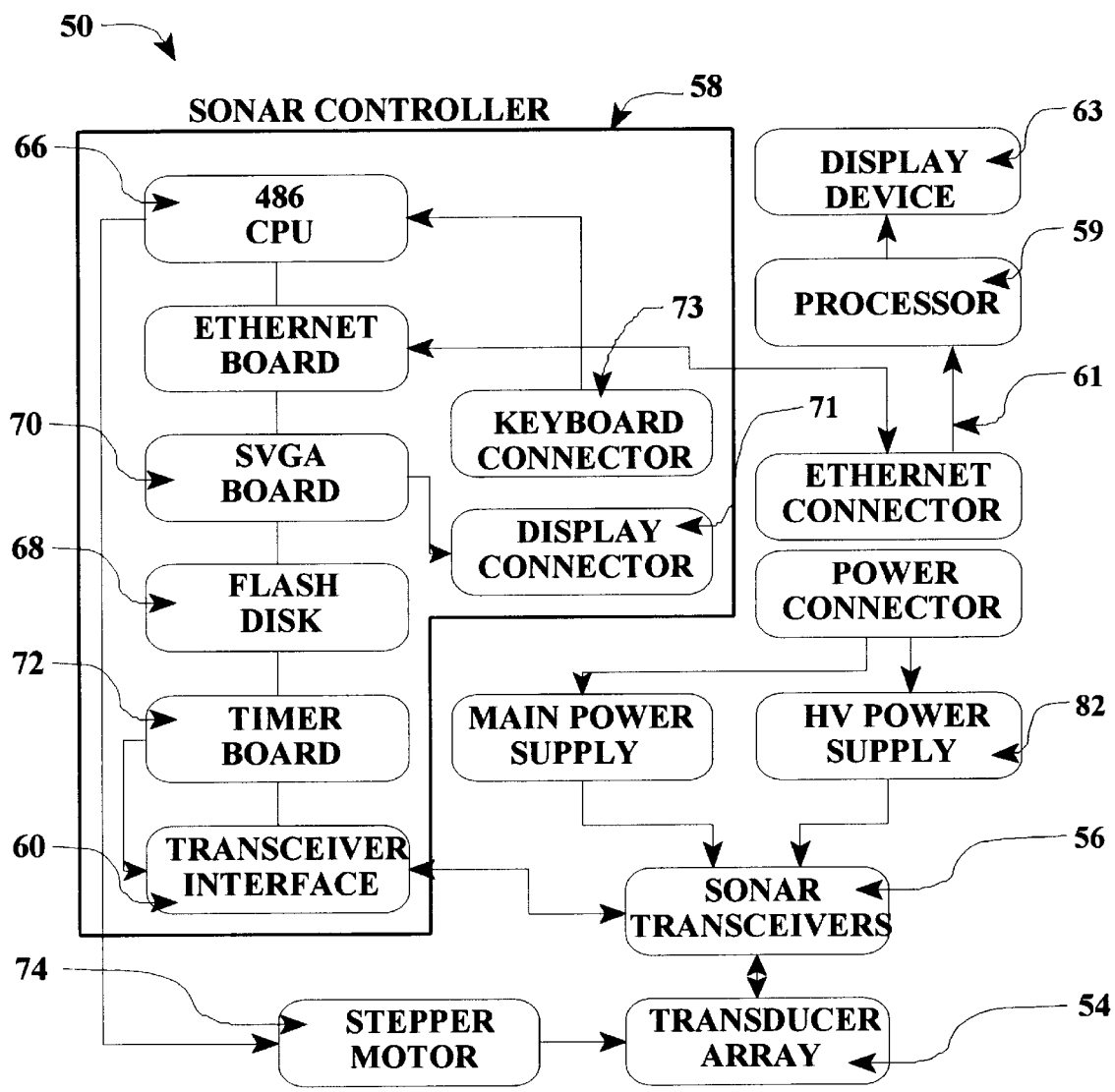
FIG. 5 is an expanded functional block diagram showing an example of a prototype apparatus adapted for small aperture underwater imaging according to the invention.

A second strategy for applying the benefits of spatial modelling to acoustic imaging is small aperture imaging. FIG. 5 is an expanded functional block diagram showing an example of a prototype apparatus 50 adapted for small aperture underwater imaging according to the invention. Conceptually, apparatus 50 is a multi-channel coherent sonar similar in architecture to existing multi-beam systems but with far fewer receive channels than a typical beam-formed imaging sonar. Functionally, apparatus 50 is a multi-element sidescan sonar similar to existing interferometric sidescan systems but with more than just two sidescan array elements. The objective of the new sonar concept is to sort acoustic backscatter based on vertical angle-of-arrival $\theta$, as a function of range R. Apparatus 50 may therefore be called Small Aperture Range versus Angle ("SARA") sonar.

Apparatus 50 has a transducer array 54 connected to a sonar transceiver 56. Transceiver 56 is operated by a controller 58. Sets of data samples received at transducer 56 are collected and transmitted through a data link 61 to a processor 59 by controller 58. At processor 59 the data samples are processed, as described above, to produce image data. This image data is displayed on an imaging device 63.

Array 54 comprises a number of elements 30. Array 54 is dimensioned such that its length is less than the spatial length of scattered acoustic pulses. This is because the pulse length of scattered pulses from all angles of arrival of interest must be long enough to encompass the entire array 54. In general, range resolution decreases as the pulse length increases. Therefore in most sonar systems it is preferable that the length of array 54 should not exceed about 10 wavelengths. If the elements of array 54 are spaced ½ wavelength apart then, in general, it is preferable that the number of elements in array 54 should be less than about 20. A practical apparatus which demonstrates the advantages of the invention may be made, for example with an array 54 having 6 elements.

Transceiver 56 is interfaced with a transceiver interface 60 in sonar controller 58. Transceiver 56 has a separate channel for each element 30 of transducer array 54. Preferably, for maximum versatility separate circuitry is used for each channel.

Figure 4:
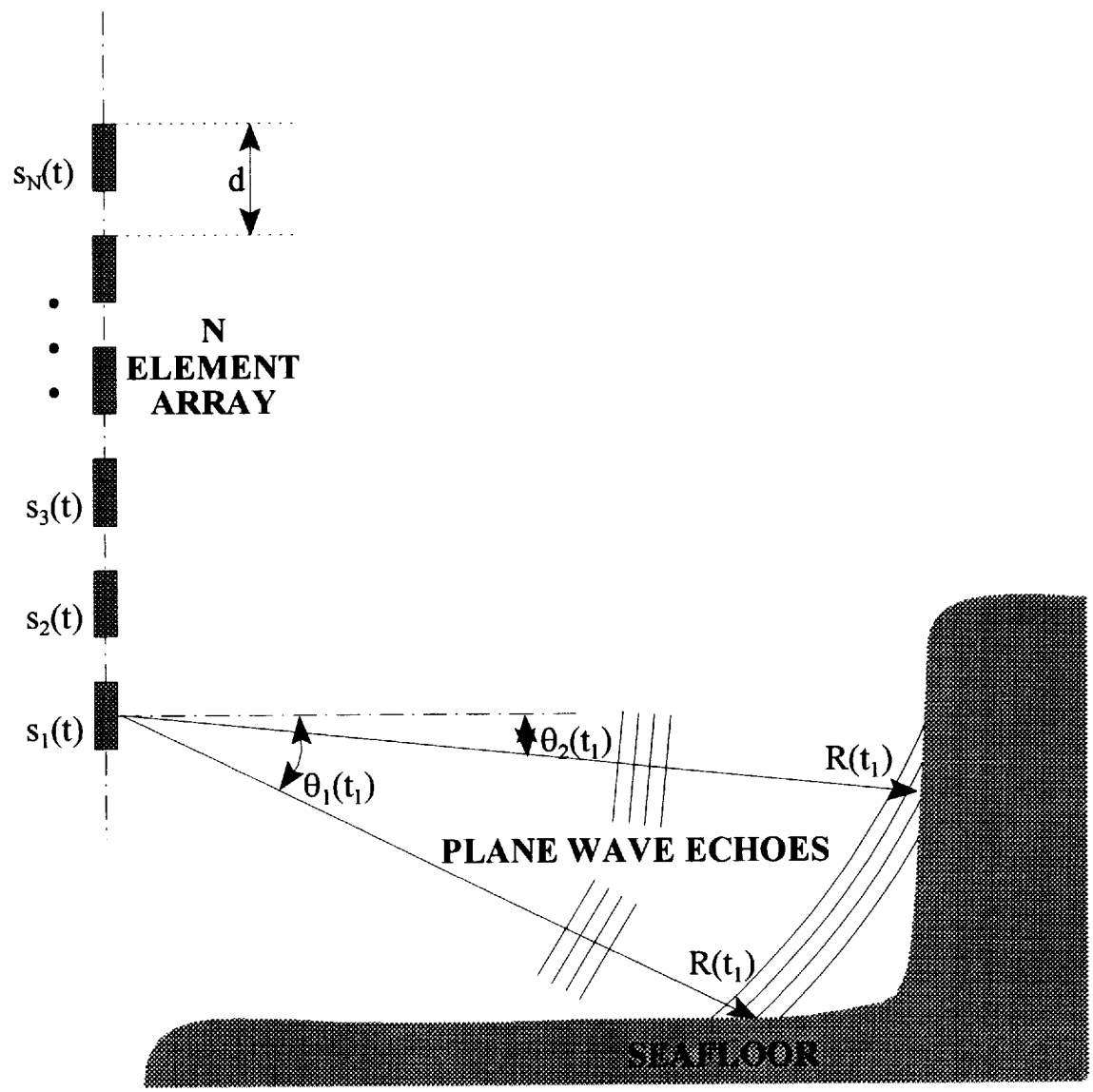
FIG. 4 is a schematic diagram illustrating the use of apparatus according to the invention to image a vertical structure on a generally horizontal portion of the sea floor.
Figure 6:
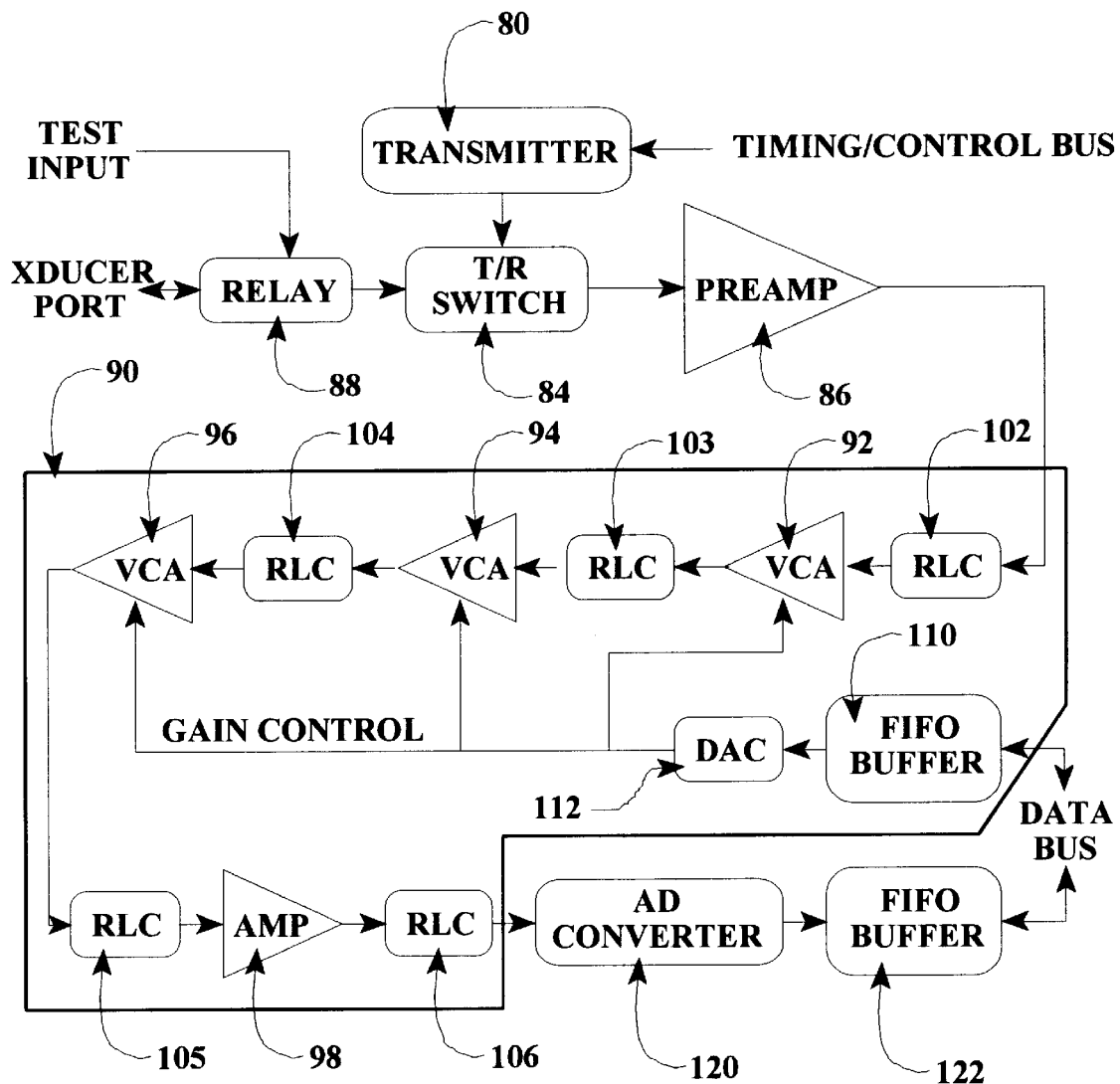
FIG. 6 is a functional diagram of circuitry for implementing one channel of a transceiver in the apparatus of FIG. 5; and, FIG. 7 is a schematic illustrating a simple transmit/receive switch that may be used in the invention.
Figure 7:
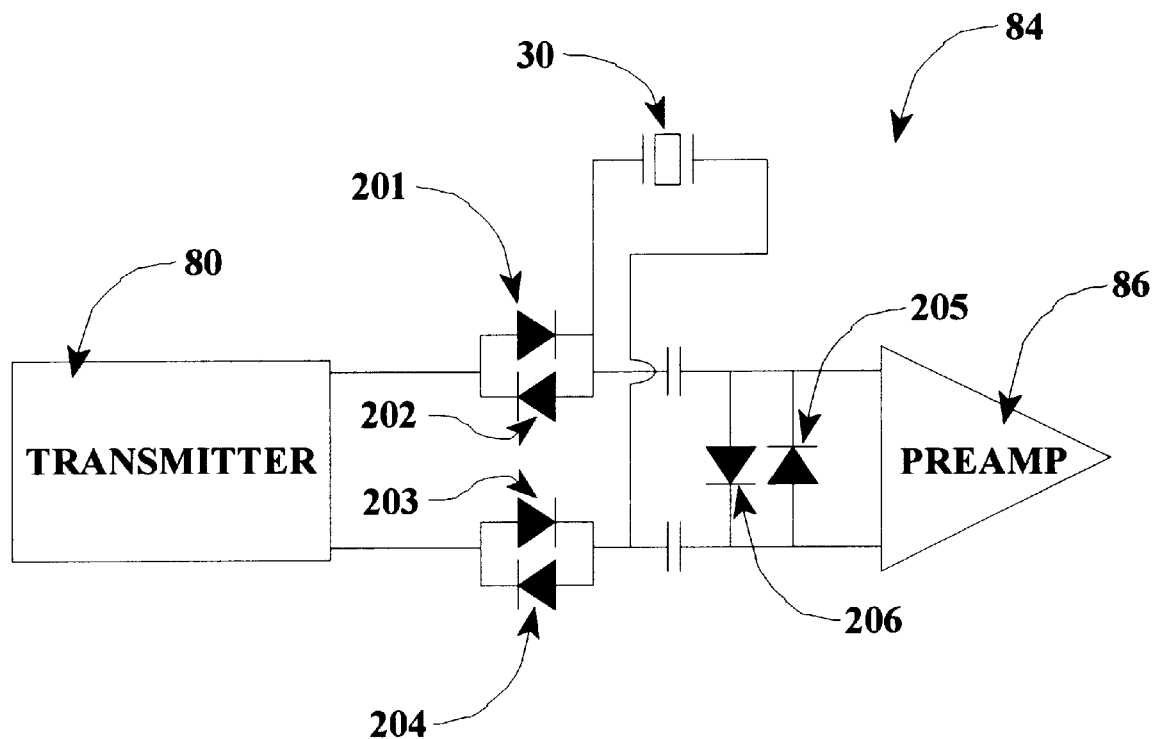

FIG. 6 is a functional diagram of circuitry for implementing one channel of transceiver 56. Transceiver 56 is configured to transmit a pulse and, for a period after the pulse has been transmitted, to receive scattered signals. Transceiver 56 has a transmitter 80. Transmitter 80 comprises an H bridge MOSFET switch which toggles two transducer terminals between ground and the potential of an external high voltage supply 82 (FIG. 4). To generate each pulse, the H-bridge is switched at the carrier frequency for a number of cycles determined by the desired pulse length. Transmitter 80 is coupled to a transducer element 30 via a transmit/receive switch 84. Switch 84 may, for example, comprise a circuit as shown in FIG. 7. On transmit, diodes 205 and 206 conduct and clip the signal transmitted by transmitter 80 to prevent overloading the input of the receiver. Diodes 201, 202, 203, and 204 have a negligible effect on the signal transmitted by transmitter 80. On receive, diodes 201, 202, 203, and 204 isolate receiver preamplifier 86 from the impedance of transmitter 80. Diodes 205 and 206 are not conducting. It is assumed that the received signals are less than the clipping voltage of diodes 201 through 206.

After a pulse has been transmitted, transmit/receive switch 84 is switched to its "receive" position. Signals received at transducer element 30 then pass through transmit/receive switch 84 to receive preamplifier 86. Receive preamplifier 86 buffers the input from transducer element 30 and is preferably a low gain, high impedance, wide bandwidth, low noise preamplifier. A relay 88 may be provided to enable the input of preamplifier 86 to be selectively connected to a test input for diagnostic purposes.

The received signal passes from preamplifier 86 to amplification and filtering stage 90. Amplification and filtration stage 90 comprises three low noise wide bandwidth variable gain amplifiers 92, 94 and 96 a buffer amplifier 98 and five separate RLC filters 102, 103, 104, 105, and 106. The maximum gain of stage 90 is about 120 dB. The gain of stage 90 can be set by placing a desired value at the head of buffer 110. Digital to Analog converter 112 reads this value and produces an output voltage which sets the gains of amplifiers 92, 94 and 96. Time variable gain (TVG) may be implemented by placing a series of values in buffer 110 and sequentially moving the values to the head of buffer 110 each time it is desired to change the gain of stage 90.

Filters 102, 103, 104, 105, and 106 are tuned to provide the desired bandwidth. For example, where the carrier frequency is 300 kilohertz, filters 102, 103, 104, 105, and 106 may be tuned to provide a 3 dB bandwidth of 60 kHz and a combined rolloff of 30 dB/octave. Buffer amplifier 98 provides a manually adjustable gain stage to compensate for filter insertion losses before the input of Analog to Digital converter ("ADC") 120.

After each pulse, ADC 120 periodically samples the output of stage 90. For each sample, ADC 120 makes two conversions spaced apart in time by ¼ of a carrier cycle. These two conversions can be used to obtain both in phase and quadrature components of the received signal. Each sample, comprising both inphase and quadrature components, is stored in a buffer 122. Typically ADC 120 will sample the output of stage 90 between a few dozen and a few tens of thousand times for each pulse.

ADC 120 may be replaced with a pair of slower ADC's sampling synchronously ¼ of a carrier cycle apart. This alternative construction introduces errors because the two slower ADC's will not, in general, be perfectly matched. In the alternative, ADC 120 could be operated to make two conversions for each sample separated in time by $n/4f_c$ where n is an odd integer. This construction introduces errors as a result of inphase/quadrature sample timing skew but may be used to practice the invention with less expensive, more readily obtainable ADC's.

Buffer 122 stores sampled data for processing by processor unit 59. Data from one or more pulses may be stored in buffer 122 and then the contents of buffer 122 may be transmitted to processor unit 59 under the control of controller 58 for processing. In the alternative, if processor unit 59 and data channel 61 are fast enough then data may be transmitted to processing unit 59 as it is received and processed in real time.

A three dimensional image may be built up by changing the orientation of transducer array 54 after one or more pulses. This may be accomplished, for example, by pivoting transducer array 54 through a small angle about an axis after each set of one or more pulses has been transmitted and the resulting scattered signals have been received. The rotation may, for example, be driven by a stepper motor controlled by controller 58. In an alternative embodiment of the invention, a 3D sector scan sonar may be implemented by using a small number of vertically stacked transducer elements to afford vertical imaging in addition to conventional horizontal scanning.

Controller 58 comprises a timer 72. Timer 72 comprises a number of counter/timers which coordinate the operation of transceiver 56. For example, timer 72 generates triggers which cause transceiver 56 to: begin and end transmitting pulses; sample received pulses; and, update the time variable gain value which sets the gain of amplifiers 92, 94 and 96. The operation of timer 72 is conventional and is known to those skilled in the art.

Controller 58 also comprises a processor 66. Processor 66 has three primary functions. Firstly, processor 66 controls the uploading of sampled data to processing unit 59. Secondly, processor 66 receives and implements commands sent by processing unit 59. For example, processing unit 69 might send a command requiring that the length of transmitted pulses be increased. Processor 66 would receive the command and write appropriate values to registers in timer unit 72 to implement the command. Thirdly, processor 66 controls the orientation of transducer array 54 through a suitable interface connected to stepper motor 74.

Controller 58 may be equipped with suitable user interfaces such as a keyboard connector 73, display driver 70 and display connector 71 to allow trouble shooting of controller 58.

Data channel 61 is a suitable data link capable of carrying commands and configuration information from processing unit 59 to controller 58 and data from controller 58 to processing unit 59. Data channel 61 may, for example, comprise an Ethernet connection incorporating suitable hardware and software interfaces at controller 58 and processing unit 59.

Processing unit 59 preferably comprises a programmed general purpose computer. Display device 63 comprises, for example, a monitor or a plotter connected to processing unit 59. FIGS. 3B and 3C illustrate the operation of computer software running in processing unit 59 for implementing the methods of the invention. In one embodiment the software may be written in the C programming language. Of course, other programming languages such as MATLAB could be used to create suitable processing software.

It can be appreciated that the approach of this invention is not limited by the physical size of the receive transducer array but instead by model uncertainties. Therefore high resolution images may be obtained using a small aperture.

Many alterations and modifications are possible in the practice of this invention without departing from the spirit or scope thereof. For example, the invention has been described herein using as an example, acoustic imaging of the sea floor. The invention could also be applied to other imaging situations wherein image data is obtained transmitting a pulse of acoustic or electromagnetic radiation and then detecting a scattered signal. For example, the invention could be applied to medical or commercial ultrasound imaging or radar imaging.

While a specific embodiment of apparatus for practising the invention has been described above, those skilled in the art will understand that the invention may be practised with different apparatus. For example, the foregoing description describes apparatus 50 in which processing steps are performed in a programmed general purpose computer. In some cases it might be desirable to create hardware for implementing these processing steps. In apparatus 50 data collection and data processing are performed in physically separate devices connected by data link 61. It would be possible to perform the data collection and data processing step in a single device. For example, if processor 66 in controller 58 is sufficiently powerful then processor 66 could be used to implement the processing steps described above as being carried out in processor unit 59.

The invention may be provided to users in various ways. For example, the invention may be provided in the form of apparatus adapted for practising the methods of the invention. The invention may also be provided in the form of a computer readable medium containing computer software which, when run on a computer system will cause that computer system to implement the processing steps of the invention.

Accordingly, the scope of the invention is to be construed in accordance with the substance defined by the following claims.

We claim:

1. A method for imaging a region, the method comprising the steps of:
   (a) transmitting a pulse toward the region;
   (b) at a receiver transducer array comprising a plurality of N elements detecting a signal scattered from the region to yield a multi-channel scattering signal;
   (c) obtaining L snapshots, where L is an integer with $L \geq 1$, by sampling the scattering signal at one or more instants after transmitting the pulse to yield a plurality of complex samples;
   (d) in a processing device, processing the plurality of complex samples to obtain image data comprising angles of arrival from M principal scattering components, where M is an integer, with $1 \leq M \leq N-1$, by the steps of:
   (i) constructing a sample matrix $S_{L,M,N}$ from the complex samples;
   (ii) from the sample matrix computing a null-space vector w comprising a plurality of entries;
   (iii) computing a plurality of roots of a polynomial formed from the entries of the null-space vector;
   (iv) from the roots of the polynomial computing angles of arrival for M principal scattering components; and,
   (v) storing the angles of arrival as image data.

2. The method of claim 1 wherein the step of computing the null space vector comprises numerically finding a vector w in a search space according to a best fit criterion.

3. The method of claim 2 wherein the best fit criterion is selected from the group consisting of: maximum likelihood, sub-space decomposition fitting or least squares fitting.

4. The method of claim 3 comprising computing the null space vector by a least squares estimator by finding a vector w in a search space which minimizes the quantity e given by:

$$\epsilon = |S_{L,M,N} w|^2.$$

5. The method of claim 4 wherein computing the null space vector while minimizing c comprises:
   (1) forming a sub-matrix by taking all but the first column of the sample matrix;
   (2) computing a Moore-Penrose pseudo-inverse matrix of the sub-matrix using singular value decomposition; and,
   (3) multiplying the pseudo-inverse matrix by the first column of the sample matrix.

6. The method of claim 4 wherein the procedure for obtaining w while minimizing e comprises the steps of:
   (a) forming an estimate of an array covariance matrix $R_{L,M,N}$ by performing the operation:

$$R_{L,M,N} = S_{L,M,N}{}^H S_{L,M,N}$$

(b) performing an eigen decomposition on $R_{L,M,N}$ and selecting an eigen vector associated with a smallest eigen value of $R_{L,M,N}$.

7. The method of claim 3 comprising computing the null space vector from the sample matrix using a sub-space decomposition method comprising the steps of:
   a. obtaining an estimate of a covariance matrix from the sample matrix;
   b. performing an eigen decomposition on the estimated covariance matrix to yield eigen values and eigen vectors; and,
   c. forming the null space vector w from a combination of the eigen vectors.

8. The method of claim 3 wherein processing the complex samples comprises computing amplitudes for scatterers corresponding to the selected roots from the sample matrix and the angles of arrival and storing the amplitudes with the image data.

9. The method of claim 2 wherein the step of processing the plurality of complex samples comprises:
   (a) selecting those roots of the polynomial which have a magnitude in the range of $1-\Delta_1$ to $1+\Delta_2$, where $\Delta_1$ and $\Delta_2$ are predetermined threshold values; and
   (b) storing as image data only the angles of arrival corresponding to the selected roots.

10. The method of claim 9 wherein $\Delta_1 = \Delta_2$.

11. The method of claim 9 wherein processing the complex samples comprises computing amplitudes for the M scatterers from the sample matrix and the angles of arrival and storing the amplitudes with the image data.

12. The method of claim 11 comprising comparing the amplitudes to a threshold and storing a binary value indicating whether the amplitudes are greater than or less than the threshold with the image data.

13. The method of claim 1 wherein the step of processing the plurality of complex samples comprises:
   (a) selecting those roots of the polynomial which have a magnitude in the range of $1-\Delta_1$ to $1+\Delta_2$, where $\Delta_1$ and $\Delta_2$ are predetermined threshold values; and
   (b) storing as image data only the angles of arrival corresponding to the selected roots.

14. The method of claim 13 wherein $\Delta_1 = \Delta_2$.

15. The method of claim 13 wherein processing the complex samples comprises computing amplitudes for scatterers corresponding to the selected roots from the sample matrix and the angles of arrival and storing the amplitudes with the image data.

16. The method of claim 13 comprising displaying the image data on a display device and subsequently accepting user specified values for $\Delta_1$, $\Delta_2$, or both $\Delta_1$ and $\Delta_2$, generating new image data corresponding to the user specified values and displaying the new image data on the display device.

17. The method of claim 1 wherein processing the complex samples comprises computing amplitudes for the M scatterers from the sample matrix and the angles of arrival and storing the amplitudes with the image data.

18. The method of claim 17 comprising comparing the amplitudes to a threshold and storing a binary value indicating whether the amplitudes are greater than or less than the threshold with the image data.

19. The method of claim 1 comprising displaying the image data on a display device.

20. The method of claim 1 wherein the sample matrix comprises a first plurality of complex samples, all of the first plurality of complex samples detected at a first time.

21. The method of claim 20 wherein the sample matrix consists of the first plurality of complex samples and is of the form:

$$S_{1,M,2M} = \begin{pmatrix} s_1(l) & s_2(l) & s_3(l) & \cdots & s_{M+1}(l) \\ s_2(l) & s_3(l) & s_4(l) & & s_{M+2}(l) \\ \vdots & & & \ddots & \vdots \\ s_M(l) & s_{M+1}(l) & s_{M+2}(l) & & s_{2M}(l) \end{pmatrix}$$

where $s_n(l)$ is a complex sample taken at the $n^{th}$ element of the transducer array, l is an index representing the first time, and n is an integer in the range $1 \leq n \leq N$.

22. The method of claim 20 wherein the sample matrix comprises a second plurality of complex samples detected by the transducer array at a second time different from the first time.

23. The method of claim 22 wherein the sample matrix is of the form:

$$S_{L,M,N} = \begin{pmatrix} s_1(l) & s_2(l) & s_3(l) & \cdots & s_{M+1}(l) \\ s_2(l) & s_3(l) & s_4(l) & & s_{M+2}(l) \\ \vdots & & & & \vdots \\ s_{N-M}(l) & s_{N-M+1}(l) & \cdots & & s_N(l) \\ s_1(l+1) & s_2(l+1) & s_3(l+1) & & s_{M+1}(l+1) \\ \vdots & & & \ddots & \vdots \\ s_{N-M}(l+L-1) & s_{N-M+1}(l+L-1) & s_{N-M+2}(l+L-1) & \cdots & s_N(l+L-1) \end{pmatrix}$$

where $s_n(l)$ is a complex sample taken at the $n^{th}$ element of the transducer array, l is an index representing the time at which the sample is taken, and n is an integer in the range $1 \leq n \leq N$.

24. The method of claim 1 wherein the polynomial has $N-1$ roots where N is the number of elements in the transducer array.

25. The method of claim 1 comprising the step of reorienting the transducer array after step (c) and then repeating steps (a) (b) and (c) to produce another set of complex samples.

26. The method of claim 1 wherein the step of transmitting the pulse comprises coding the pulse so as to increase a time bandwidth product of the transmitted pulse and the method includes decoding the received scattered signals so as to increase a signal-to-noise ratio of the multi-channel scattering signal.

27. The method of claim 1 wherein the step of processing the plurality of complex samples includes the steps of:

(a) forming Q beams with offset phase centers by taking linear combinations of the complex samples, where Q is an integer and $Q \leq N$, and, (b) forming the sample matrix from outputs of the beams.

$$S_{L,P,Q} = \begin{bmatrix} s_1(l) & s_2(l) & \cdots & s_{P+1}(l) \\ s_2(l) & s_3(l) & & s_{P+2}(l) \\ \vdots & & & \vdots \\ s_{Q-P}(l) & s_{Q-P+1}(l) & \cdots & s_Q(l) \\ s_1(l+1) & s_2(l+1) & & s_{P+1}(l+1) \\ s_2(l+1) & s_3(l+1) & & s_{P+2}(l+1) \\ \vdots & & & \vdots \\ s_{Q-P}(l+1) & s_{Q-P+1}(l+1) & \cdots & s_Q(l+1) \\ \vdots & & & \vdots \\ s_1(l+L-1) & s_2(l+L-1) & \cdots & s_{P+1}(l+L-1) \\ s_2(l+L-1) & s_3(l+L-1) & & s_{P+2}(l+L-1) \\ \vdots & & & \vdots \\ s_{Q-P}(l+L-1) & s_{Q-P+1}(l+L-1) & \cdots & s_Q(l+L-1) \end{bmatrix}$$

28. The method of claim 27 wherein the sample matrix has the form:

$$S_{L,M,Q} = \begin{bmatrix} s_1(l) & s_2(l) & \ldots & s_{M+1}(l) \\ s_2(l) & s_3(l) & \ldots & s_{M+2}(l) \\ \vdots & \vdots & & \vdots \\ s_{Q-M}(l) & s_{Q-M+1}(l) & \ldots & s_Q(l) \\ s_1(l+1) & s_2(l+1) & \ldots & s_{M+1}(l+1) \\ s_2(l+1) & s_3(l+1) & \ldots & s_{M+2}(l+1) \\ \vdots & \vdots & & \vdots \\ s_{Q-M}(l+1) & s_{Q-M+1}(l+1) & \ldots & s_Q(l+1) \\ \vdots & \vdots & & \vdots \\ s_1(l+L-1) & s_2(l+L-1) & \ldots & s_{M+1}(l+L-1) \\ s_2(l+L-1) & s_3(l+L-1) & \ldots & s_{M+2}(l+L-1) \\ \vdots & \vdots & & \vdots \\ s_{Q-M}(l+L-1) & s_{Q-M+1}(l+L-1) & \ldots & s_Q(l+L-1) \end{bmatrix}$$

where $s_q(1)$ is the complex output from the $g^{th}$ beam at an $1^{th}$ time interval, with 1 an integer in the range $1 \leq 1 \leq L$, L is an integer such that $L \geq 1$, q is an integer in the range $1 \leq q \leq Q$, and M is an integer with $1 \leq M \leq Q-1$.

29. The method of claim 1 comprising repeating the steps (b) through (d) to produce image data corresponding to groups of principal scatterers at different distances from the receive transducer array.

30. The method of claim 1 wherein $N \geq 3$.

31. An imaging system comprising:
   (a) a transmit transducer;
   (b) a pulse generator connected to the transmit transducer;
   (c) a receive transducer array;
   (d) a receiver connected to the receive transducer array, the receiver comprising:
      (i) a multi-channel amplifier for amplifying scattered signals detected by each element of the receive transducer array; and,
      (ii) an analog to digital conversion circuit connected to the multi-channel amplifier to sample the amplified scattered signals to produce a series of complex samples;
   (e) a processor connected to receive the series of complex samples from the analog to digital conversion circuit, the processor performing the following operations for each of a plurality of ranges:
      (i) select a group of complex samples corresponding to a range;
      (ii) construct a sample matrix $S_{L,M,N}$ from the group of complex samples;
      (iii) compute from the sample matrix a null space vector w comprising a plurality of entries;
      (iv) compute the roots of a polynomial formed from the entries of the null-space vector;
      (v) compute angles of arrival for one or more scatterers from the roots of the polynomial;
      (vi) compute amplitudes for the one or more scatterers from the sample matrix and the angles of arrival; and,
      (vii) store the range, angles of arrival and amplitudes as image data; and,
   (f) a display device driver connected to receive the image data and to display the image data on a display device.

32. A processing unit for processing scattering signal data received at a multi-channel transducer to yield image data, the processing unit comprising:
   (i) an input for receiving scattering signal data, the scattering signal data representing signals scattered by one or more objects and comprising a plurality of sets of complex samples, the sets detected sequentially at a transducer array, each set comprising a complex sample obtained from each of a plurality of elements in the array,
   (ii) means for selecting a group of complex samples corresponding to a distance range;
   (iii) means for constructing a sample matrix $S_{K,M,N}$ from the group of complex samples;
   (iv) means for computing a null-space vector w comprising a plurality of entries from the sample matrix;
   (v) means for computing roots of a polynomial formed from the entries of the null-space vector;
   (vi) means for computing angles of arrival for two or more scatterers from the roots of the polynomial;
   (vii) means for computing amplitudes for the two or more scatterers from the sample matrix and the angles of arrival;
   (viii) means for storing the range, angles of arrival and amplitudes as image data and,
   ix output means for delivering an image signal representing the image data, the image signal, when displayed on a display, graphically depicting the objects.

33. A computer readable medium containing computer software, the computer software, when run on a computer providing a processing means for:
   (a) constructing a sample matrix $S_{K,M,N}$ from the complex samples;
   (b) obtaining from the sample matrix a null-space vector w;
   (c) computing the roots of a polynomial formed from the entries of the null-space vector;
   (d) computing angles of arrival for two or more scatterers from the roots of the polynomial;
   (e) computing amplitudes for the two or more scatterers from the sample matrix and the angles of arrival; and,
   (f) storing the angles of arrival and amplitudes as image data.

34. A method for imaging a region, the method comprising the steps of:
   (a) transmitting a pulse toward the region;
   (b) at a receiver transducer array comprising a plurality of N elements, with $N \geq 2$ detecting a signal scattered from the region to yield a multi-channel scattering signal;
   (c) obtaining L snapshots, where L is an integer with $L \geq 1$, by sampling the scattering signal at one or more instants after transmitting the pulse to yield a plurality of complex samples; and,
   (d) in a computer, processing the plurality of complex samples to obtain image data comprising angles of arrival from M principal scattering components, where M is an integer, with $2 \leq M \leq N-1$.

35. The method of claim 34 wherein $N \geq 2$.

36. The method of claim 34 wherein $N \geq 3$.

37. The method of claim 34 wherein processing the plurality of complex samples comprises:
   (i) constructing a sample matrix $S_{L,M,N}$ from the complex samples;

(ii) from the sample matrix generating a null-space vector w comprising a plurality of entries;

(iii) computing values for a plurality of roots of a polynomial formed from the entries of the null-space vector;

(iv) from the roots of the polynomial computing angles of arrival for M principal scattering components; and, (v) storing the angles of arrival as image data.

38. The method of claim 36 wherein generating the null-space vector w comprises numerically finding a vector w in a search space according to a best fit criterion.

39. The method of claim 34 wherein processing the complex samples comprises computing an amplitude associated with each of the M principal scattering components and storing the amplitudes with the image data.

40. The method of claim 34 wherein transmitting the pulse comprises coding the pulse so as to increase a time bandwidth product of the transmitted pulse and the method comprises decoding the received scattered signals so as to increase a signal-to-noise ratio of the multi-channel scattering signal.

41. The method of claim 34 comprising changing the orientation of the receiver transducer array after obtaining the L snapshots and then repeating steps (a), (b) and (c) to obtain another plurality of complex samples.

* * * * *